No. 614,455. Patented Nov. 22, 1898.
O. O. FJELD.
LIFTING ATTACHMENT FOR PLOWS.
(Application filed Feb. 26, 1898.)

(No Model.) 2 Sheets—Sheet 1.

Witnesses.
Harry Kilgore,
P. D. Merchant.

Inventor.
Oluf O. Fjeld.
By his Attorney.
Jas. F. Williamson

No. 614,455. Patented Nov. 22, 1898.
O. O. FJELD.
LIFTING ATTACHMENT FOR PLOWS.
(Application filed Feb. 20, 1898.)
(No Model.) 2 Sheets—Sheet 2.
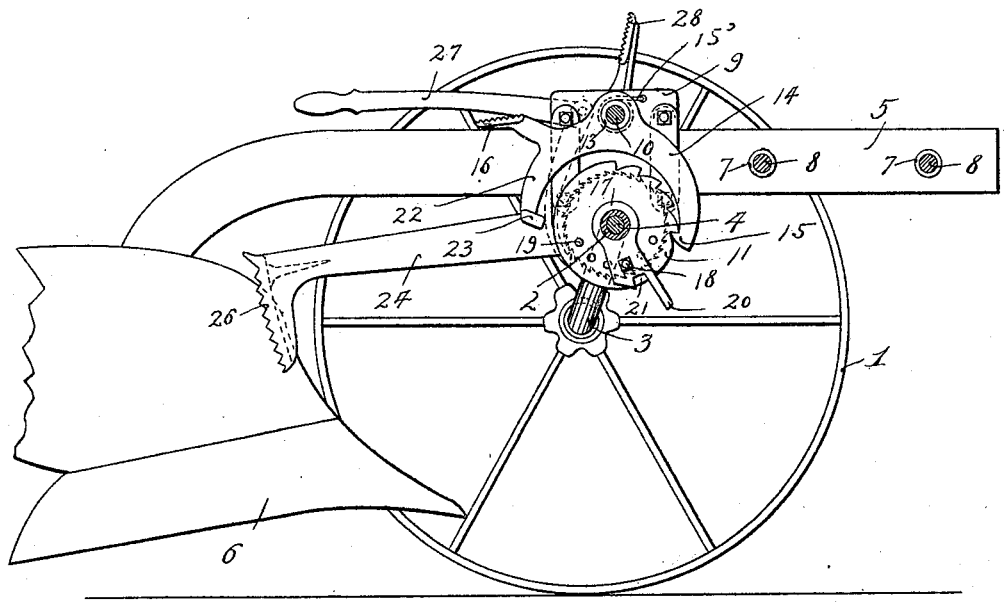
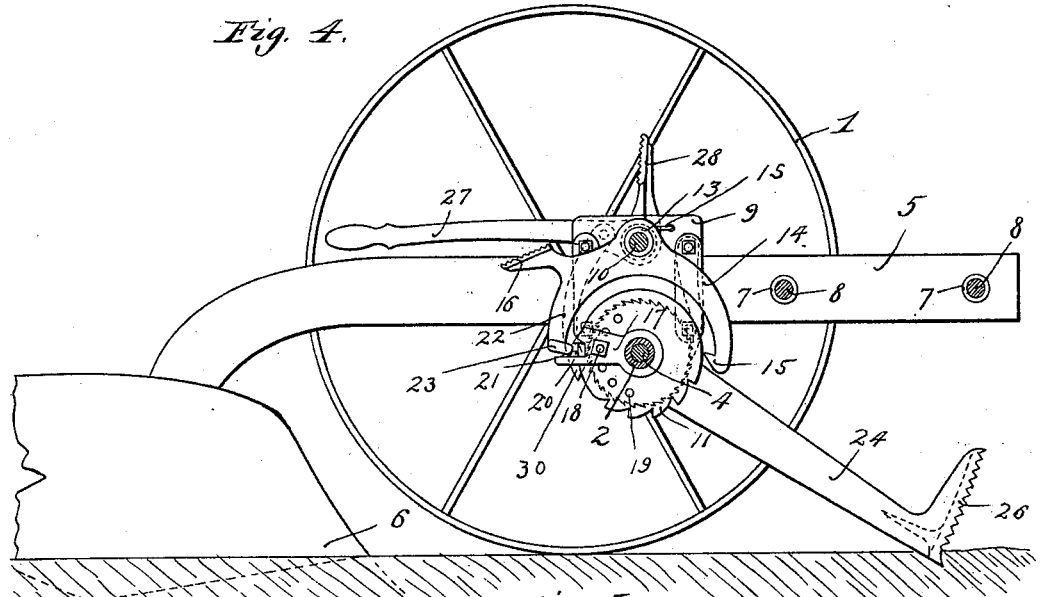
Witnesses:
Harry Kilgore
G. D. Merchant
Inventor
Oluf O. Fjeld
By his Attorney
Jas. F. Williamson

UNITED STATES PATENT OFFICE.

OLUF O. FJELD, OF MAYVILLE, NORTH DAKOTA.

LIFTING ATTACHMENT FOR PLOWS.

SPECIFICATION forming part of Letters Patent No. 614,455, dated November 22, 1898.

Application filed February 26, 1898. Serial No. 671,762. (No model.)

*To all whom it may concern:*

Be it known that I, OLUF O. FJELD, a citizen of the United States, residing at Mayville, in the county of Traill and State of North Dakota, have invented certain new and useful Improvements in Lifting Attachments for Plows; and I do hereby declare the following to be a full, clear, and exact description of the invention, such as will enable others skilled in the art to which it appertains to make and use the same.

My invention relates to sulky or wheeled plows, and has for its object to provide mechanism whereby the plow or plows may be raised from working positions by the draft or drawing strain upon the machine, this action being effected at will by means of foot or hand operated trips or controlling devices, which require but very little power to actuate them.

To the end above indicated my invention consists of the novel devices and combinations of devices hereinafter described, and defined in the claims.

The preferred form of my invention is illustrated in the accompanying drawings, wherein like characters indicate like parts throughout the several views.

Figure 1:
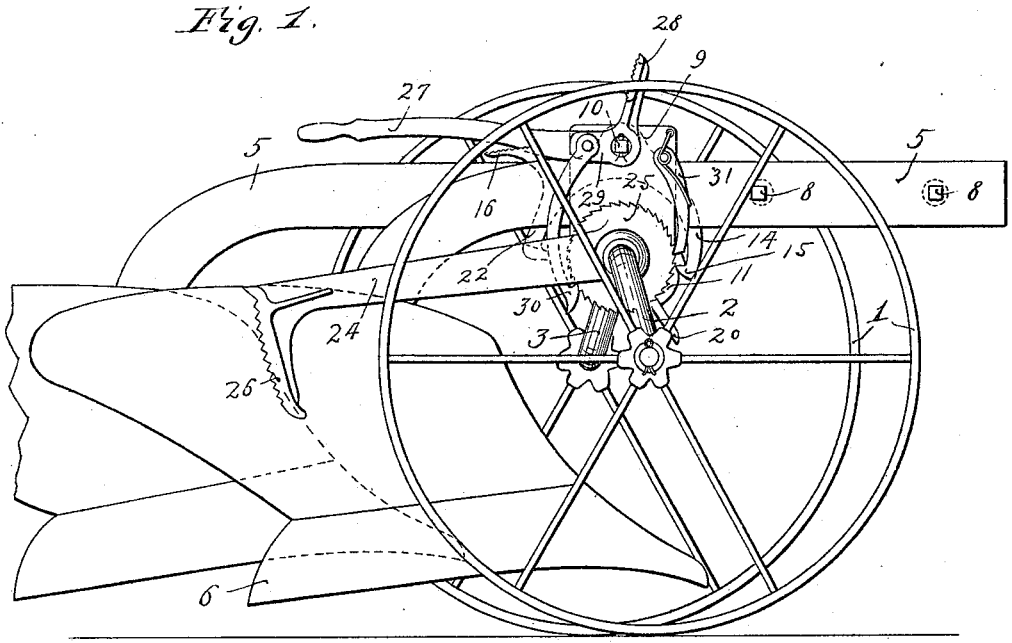
Figure 2:
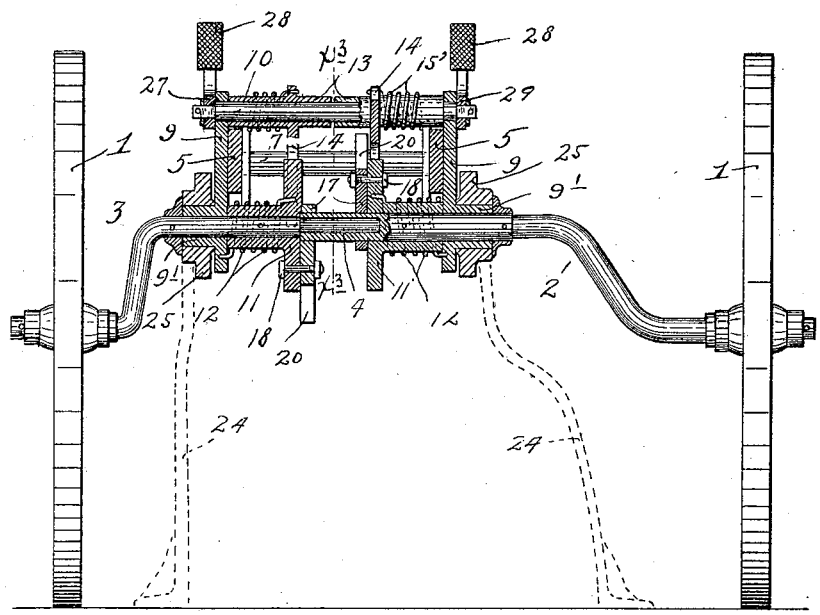

Figure 1 is a view in right side elevation, showing the plows in their raised positions. Fig. 2 is a view in rear elevation, with some parts shown as sectioned on the center line of the crank-axle. Fig. 3 is a longitudinal vertical section taken approximately on the line $x^3$ $x^3$ of Fig. 2. Fig. 4 is a view which corresponds to Fig. 3, but shows the plows as lowered and the lifting legs or levers as thrown into contact with the ground in position to become effective to lift the plows under the further advance movement of the machine; and Fig. 5 is a detail view taken also on the line $x^3$ $x^3$, but looking toward the right-hand side of the machine or in a reverse direction from that in which Figs. 3 and 4 are viewed.

1 indicates the wheels of the sulky-plow, and 2 3 the sections of a divided crank-axle, which sections are swiveled, as shown at 4.

5 indicates a pair of parallel plow-beams, provided with plows 6, rigidly secured together, as shown, by means of spacing-thimbles 7 and nutted tie-bolts 8. These plow-beams 6 are provided with rigidly-secured depending bearing-plates 9, the lower portions of which are pivotally mounted on the crank portion of the axle 2 3. The upper portions of the said plates 9 project above the plow-beams 5 and are connected by a transverse rock-shaft 10, that is loosely journaled therein. The ends of this rock-shaft 10 project for purposes which will hereinafter appear. The pole to which the draft-animals are hitched is not shown, but would be secured to the forwardly-projecting ends of the plow-beams 5 in any ordinary or suitable manner.

The crank portions of the axle-sections 3 and 2 are provided with ratchet disks or segments 11, the hubs of which are rigidly secured to said crank portions and the teeth of which extend in different circumferential directions.

When the plows are raised to their limit, the wheels and sections of the axle will stand as shown in Fig. 1, by reference to which it will be seen that the wheels stand one in advance of the other, with the crank portions of the axle diverging from each other. Hence when the plows are lowered the wheels will be spread farther apart or one farther in advance of the other, and to permit these movements the crank-sections 2 and 3 will move on their swivel connection 4 with a toggle action, or, in other words, said sections 2 and 3 will rotate on said swivel 4 in reverse directions. Hence the necessity for extending the ratchet-teeth of the disks 11 in reverse circumferential directions.

Strong springs 12, coiled on the hubs of the ratchet-disks 11 and secured to said ratchet-disks and to the bearing-plates 9, resist with a strong torsional spring action the rotary movements of said ratchet-disks necessary to permit the plows to lower. These springs thus act as cushions to prevent the plows from falling with a jar or bump.

Loosely mounted on the rock-shaft 10 are the hubs 13 of a pair of lock-pawls 14, that coöperate one with each of the ratchet disks or segments 11 to hold that side of the machine in whatever vertical position it is set. The free end of the right-hand member of the pawls 14 engages directly with the teeth of the coöperating ratchet-disk 11, but the free end of the left-hand member of said pawls 14 is provided with a hook or back-turned tooth 15, which engages with the teeth of its coöperating ratchet-disk 11. Springs 15', coiled on the sleeve or hub portions 13, normally hold the pawls 14 in engagement with the wheels or ratchet-disks 11. The said pawls 14 are provided with steps or foot-pieces 16, by means of which when said parts are stepped upon or otherwise pressed they may be released from their respective ratchet wheels or disks, and thus permit the plows to lower under the action of gravity.

17 indicate stop-arms which are pivoted on the crank-axle and are rigidly but adjustably secured one to each ratchet disk or wheel 11, as shown, by means of small nutted bolts 18, passed therethrough and coöperating with a series of perforations 19 in the said disks 11. At their free ends these stop-arms 17 are provided with stop-fingers 20 and lock notches or detents 21. The pawls 14 are provided with rearwardly-extended segmental portions 22, that are provided at their free ends with lock-lugs 23. These lock-lugs 23 are offset from the plane of the pawls 14 and stand one in the path of each of the stop-fingers 20 of the arms 17. The engagement of the stop-fingers 20 with the lock-lugs 23 limits the extreme downward movement of the plows. This extreme downward movement of the plows may, however, be variably set, so as to give the desired depth to the furrow by varying the adjustment of the arms 17 on their respective ratchet disks or wheels 11, as previously described.

The movement required to release the pawls 14 from the ratchet-disks will not throw the lock-lugs 23 into engagement with their respective notches or detents 21 in the arms 17. This leaves the plows held downward to their work, not positively, but by the action of gravity of the parts connected therewith; but when the rider's feet are placed on the foot-rests 16 the lock-lugs 23 will be forced into engagement with their respective notches or detents 21 of the levers 17, and the plows will then be positively locked down to their work, so that they cannot rise without lifting the whole machine, wheels and all. The springs 15' tend to keep the pawls 14 in engagement with their coöperating ratchet-wheels, as already noted, and this of course tends to throw the lock-lugs 23 out of engagement with the notches 21 when the feet are raised or removed from the foot-rests 16. To further insure this action, however, I preferably incline the stop-finger portions 20, so that they will have a camming action on the lock-lugs 23, which will tend to throw the same outward. The rider's seat is not shown, but it may, as is obvious, be supported from the plow-beam or other parts of the plow-frame in many well-known ways.

The device or devices for lifting the plows from their lowered or working positions under the action of the advance movement of the machine will now be described. As shown, they are in the form of thrust or lifting legs 24, that are pivoted around the crank portions of the axle 2 3 on sleeves 9' of plates 9, just outward of the bearing-plates 9, the same being provided at their hubs with ratchet-wheels 25 and at their free ends with segmental feet portions 26, adapted for engagement with the ground without penetrating into the same. These thrust or lifting legs 24 are of such length that when they are thrown downward into vertical position the plows will be lifted upward to their limit or highest point. A hand-lever 27, provided also with a foot-piece 28, is rigidly secured, as shown, to the left-hand end of the rock-shaft 10, and a stub-arm 29 is likewise secured to the right-hand end of said rock-shaft 10. A pair of pawls 30, pivoted one to the free end of the stub-arm 29 and the other to the intermediate portion of the lever 27, engage one with each of the ratchet-wheels 25, the same being normally held in such engagement by the action of gravity. Spring-pressed pawls 31, pivoted to the bearing-plates 9, hold the ratchet-wheels 25 and lifting-legs 24 from return movement in a direction opposite to that in which they are moved by the pawls 30.

Operation: The operation of the device as an entirety, briefly summarized, is substantially as follows: Let it be assumed that the plows are raised and that they stand, as well as the other parts, in the positions shown in Fig. 1. To release the plows, so that they will fall by gravity, although with a cushioned action, into lowered or working positions, it is only necessary to step upon the foot-rests 16, thereby releasing the pawls 14 from their respective ratchet wheels or disks 11. The plows will then be lowered until the stop-fingers 20 engage their respective lock-lugs 23. When it is desired to raise the plows from their working positions, the rock-shaft 10 may be vibrated, either by the use of the hand-lever 27 or the foot-piece 28, thereby vibrating the pawls 30 and moving the ratchet-wheels 25 and their respective lifting-legs 24 upward and forward until said legs reach a point where they will fall by their own gravity into the positions indicated in Fig. 4, in which positions the ground-feet 26 are thrown into engagement with the ground and the said legs 24 stand on an incline. In these positions of the lifting-legs 24 it is obvious that the advance movement of the machine will cause the legs 24 to straighten up and thus to raise the plows back into their inoperative positions. (Indicated in Figs. 1 and 3.) In this manner the horses or draft-animals are made to lift the plows and other parts carried therewith, and all the driver or operator has to do to cause this action is to throw the lifting-legs 24 into their operative position, an act requiring the most trifling physical exertion.

Inasmuch as the crank-shaft axle is sectioned, it is possible by adjusting the stop-arms 17 on the ratchet disks or wheels 11 to set the said parts so that one wheel may run in the furrow and the other on the unplowed ground, with the other parts of the machine standing in their true vertical or horizontal positions, as the case may be.

My improved device above described may be designed simply as an attachment for plows of this general character such as are now in general use. This attachment to the plow may be very easily made, as the plows, their beams, and other parts of the attachment may be very easily placed in working position on the axle and removed therefrom.

It will of course be understood that various alterations and modifications in the specific details of construction above described may be made, all within the scope of my invention. For example, an undivided axle and a single pawl-and-ratchet or other form of connection for suspending the plows or holding them above their working positions might be employed; but this of course would not give the independent adjustments to the wheels. Again, two or more wheels might be employed on the plow, or, in fact, it would be within the scope of my invention, although not a desirable construction, to mount the plows on skids or runners.

The term "sulky-plow" as used in this specification is intended to include all wheeled plows, whether the same consist of a gang of plows or a single plow in a given machine.

Calling attention again to the form of the feet or ground-engaging ends 26 of the lifting legs or levers 24, it is desired to say that the principal purpose of these feet is to prevent the ground-engaging end of said legs or lifting-levers from penetrating into the soft ground. However, these feet portions may be variously constructed and may extend through a greater or less arc of a circle, or they may extend on lines varying considerably from a circle. By making this foot portion 26 adjustable on the leg 24 the plow or plows may be raised into different vertical positions by adjusting the said foot.

What I claim, and desire to secure by Letters Patent of the United States, is as follows:

1. The combination with a plow or similar device and a support for carrying the same over the ground, of a plow-lifting device involving a part adapted when engaged with the ground, to lift said plow under the advance movement of the machine, and means for engaging and disengaging said ground-engaging part, with the ground, at will.

2. In a wheeled plow, the combination with one or more plows mounted for vertical movements, of one or more pivoted plow-lifting legs or levers, and a device operated at will to throw said lifting legs or levers into operative positions, substantially as described.

3. The combination with truck-wheels, a crank-axle, and one or more plows carried by the crank portion of said axle, of one or more lifting legs or levers pivoted around the crank portion of said axle, and a device operated at will to throw said lifting leg or legs into operative positions, substantially as described.

4. The combination with truck-wheels, a crank-shaft axle and one or more plows carried by the crank portion of said axle, of one or more lifting legs or levers pivoted around the crank portion of said axle, and a pawl-and-ratchet device operated at will, to throw said leg or legs into operative positions, substantially as described.

5. The combination with truck-wheels and a crank-axle constructed in swiveled sections, of a plow mounted on the crank portion of said axle, pawl-and-ratchet devices acting to hold said crank portions in their raised positions, means for releasing said pawl-and-ratchet devices, to permit the plows to lower, and a plow-lifting leg or lever adapted to be engaged with the ground at will, to raise said plow under the advance movement of the machine, substantially as described.

6. The combination with truck-wheels and a crank-shaft axle constructed in swiveled sections, of a plow mounted on the crank portions of said axle, independent pawl-and-ratchet suspending connections between said plow and the two sections of said crank-axle, and foot-rests connected to the pawl members of said pawl-and-ratchet devices and serving to release the same when stepped upon, substantially as described.

7. The combination with truck-wheels, a crank-axle and a plow carried by the crank portion of said axle, of a pawl-and-ratchet device connecting said plow to the crank portion of said axle, and suspending said plow, and an adjustable stop for variably limiting the downward movement of said plow, substantially as described.

8. The combination with the truck-wheels, crank-shaft and a plow carried by the crank portion of said axle, of a pawl-and-ratchet connection between said plow and the crank portion of said axle, a foot-piece on the pawl member of said pawl-and-ratchet device, and means for locking the ratchet member by the extreme releasing movement of said pawl member, thereby positively preventing the plow from rising, substantially as described.

In testimony whereof I affix my signature in presence of two witnesses.

OLUF O. FJELD.

Witnesses:
 C. F. KILGORE,
 F. D. MERCHANT.